(12) United States Patent
Elaoud et al.

(10) Patent No.: US 7,349,378 B2
(45) Date of Patent: Mar. 25, 2008

(54) LOCAL AREA NETWORK RESOURCE MANAGER

(75) Inventors: Moncef Elaoud, Lake Hopatcong, NJ (US); Abhrajit Ghosh, Scotch Plains, NJ (US); Ravichander Vaidyanathan, Edison, NJ (US); Prathima Agrawal, New Providence, NJ (US); Toshikazu Kodama, Morristown, NJ (US); Yasuhiro Katsube, Franklin Lakes, NJ (US)

(73) Assignees: Toshiba America Research, Inc., Morristown, NJ (US); Telcordia Technologies, Morristown, NJ (US)

( * ) Notice: Subject to any disclaimer, the term of this patent is extended or adjusted under 35 U.S.C. 154(b) by 948 days.

(21) Appl. No.: 10/370,719

(22) Filed: Feb. 24, 2003

(65) Prior Publication Data

US 2004/0165562 A1    Aug. 26, 2004

(51) Int. Cl.
*H04Q 7/24* (2006.01)
*H04L 12/43* (2006.01)
*H04J 3/16* (2006.01)

(52) U.S. Cl. .................. 370/338; 370/459; 370/468
(58) Field of Classification Search .............. None
See application file for complete search history.

(56) References Cited

U.S. PATENT DOCUMENTS

| | | | | |
|---|---|---|---|---|
| 5,644,576 A * | 7/1997 | Bauchot et al. ............ 370/437 |
| 5,770,062 A * | 6/1998 | Isbell ........................ 210/220 |
| 5,970,062 A * | 10/1999 | Bauchot ................... 370/310.2 |
| 6,529,520 B1 * | 3/2003 | Lee et al. .................... 370/442 |
| 6,842,605 B1 * | 1/2005 | Lappetelainen et al. ... 455/13.4 |
| 6,890,540 B1 * | 5/2005 | Schroder et al. ......... 424/248.1 |
| 6,947,397 B2 * | 9/2005 | Kim et al. ................... 370/329 |
| 7,002,984 B1 * | 2/2006 | Cheng ........................ 370/437 |
| 7,161,942 B2 * | 1/2007 | Chen et al. ................. 370/392 |
| 2002/0021678 A1 * | 2/2002 | Heatwole et al. ........... 370/325 |
| 2002/0025818 A1 * | 2/2002 | Kang et al. ................. 455/450 |
| 2002/0061026 A1 * | 5/2002 | Terry ......................... 370/412 |
| 2003/0072289 A1 * | 4/2003 | Yuang et al. ............... 370/338 |
| 2003/0142681 A1 * | 7/2003 | Chen et al. ................. 370/401 |
| 2004/0105412 A1 * | 6/2004 | He et al. .................... 370/338 |
| 2005/0192018 A1 * | 9/2005 | Jang ........................ 455/450 |
| 2006/0092868 A1 * | 5/2006 | Meier ........................ 370/312 |

\* cited by examiner

*Primary Examiner*—Andrew C. Lee
(74) *Attorney, Agent, or Firm*—Banner & Witcoff, Ltd (57) ABSTRACT

Aspects of the invention provide a method and system for managing or coordinating data transmission in a Local Area Network (LAN) such that Quality of Service (QoS) concerns are met. A LAN resource manager (LRM) is provided for managing the LAN resources by providing solutions for providing users with several levels of QoS. Once the LRM admits a user at a certain QoS level, the level is assured within the LAN for as long as the user is in the LAN. A user may submit a request to transmit data to the LRM. The LRM may determine if time allocation is possible and allocate the time slots for data transmission. The LRM may send time slot allocation information to an Access Server in a LAN, which may inform the user of the time slot allocation and prepare a queue according to the slot allocation information.

15 Claims, 6 Drawing Sheets

LOCAL AREA NETWORK RESOURCE MANAGER

TECHNICAL FIELD

Aspects of the present invention relate to managing local area network resources and, in particular managing local area network resources and providing users with a desired quality of service.

BACKGROUND

Local Area Networks (LANs) have been in existence for over 30 years. They are widely used in universities, enterprises and government offices. While LANs in the past have operated over wired media, lately we have been witnessing a boom in the deployment and usage of Wireless Local Area Networks (WLANs). Once only seen within the enterprise, WLANs are increasingly making their way into residential, commercial, industrial and public deployments. Recent efforts by telephone carriers to integrate LANs and WLANs into their wide-area service offerings are testimony to their growing role in the future of networking.

Voice continues to be the most predominant wireless application and in order to fully integrate with existing and future cellular systems both LANs and WLANs must deliver high quality voice service. In addition to voice services, carriers plan to offer other services such as video conferencing and data services such as Internet access.

The most common LAN protocol is Ethernet (IEEE802.3). The Ethernet protocol was designed to enable fair sharing of a common medium among several nodes. The basic access scheme is called Carrier Sense Multiple Access with Collision Detection (CSMA/CD).

In CSMA/CD, each node with data to send must first listen to the channel to make sure that there is no other node transmitting. This action is called carrier sensing. If the channel is determined to be free, the node can then begin transmitting. Once a node starts transmitting, all other nodes wait until the channel becomes free again before trying to transmit. Since signals take a finite amount of time to travel from one end of an Ethernet segment to the other, two or more nodes can determine the channel to be free and start transmitting simultaneously. When several nodes transmit at the same time a collision occurs. All nodes can detect the collision and halt their transmission.

Following a collision, the involved nodes choose a random back off period before trying to transmit their Ethernet frames again. If repeated collisions occur for a given transmission attempt, the node expands the interval from which the back off time is selected according to an algorithm known as truncated binary exponential back off algorithm. A retransmission is aborted after 16 unsuccessful attempts.

It is intuitive that as the number of nodes on a given Ethernet segment increases, and as the traffic level increases, more collisions occur as part of the normal operation of an Ethernet. The Ethernet protocol is designed to provide fair access to a shared channel.

That is all nodes within the same Ethernet have the same priority. Hence Ethernet provides a best effort data delivery system. While the best effort design of the Ethernet protocol incurs low complexity and implementation cost, it is not capable of providing different levels of service based on users' and applications' needs.

Several schemes were developed to enhance the provided quality of service in an Ethernet environment. Subnet Bandwidth Manager is one of the existing solutions that was introduced in IETF RFC 2814. The basic concept is as follows: A Subnet Bandwidth Manager (SBM) is placed in each subnet. Users that require a better than best effort quality of service use the RSVP signaling protocol to communicate with the SBM to reserve bandwidth. SBM accepts new requests only if resources are available for the new flow. Best effort users are automatically admitted into the subnet without any admission control. In the absence of any traffic control or priority mechanisms, the SBM-based admission control mechanism only limits the total traffic load. Thus, no separation of traffic flow occurs to protect flows requiring a higher level of QoS from the best-effort traffic on the same media. Therefore, given the lack of control of best effort traffic and depending on the traffic flow load, the network might not honor reservations made by flows requiring a higher level of QoS over reservations made by best effort traffic flows.

The most widely spread WLAN protocol is IEEE802.11. IEEE802.11 was designed to provide channel sharing similar to Ethernet (IEEE802.3) in a wireless environment. IEEE802.11 has two different modes of operation. The first is the basic mode called Distributed Coordination Function (DCF). DCF is a contention-based access mode that adopts the Carrier Sense Multiple Access with Collision Avoidance (CSMA/CA) scheme. The second, an optional mode called Point Coordination Function (PCF), uses a polling access strategy.

The basic DCF mode is based on Carrier Sense Multiple Access with Collision Avoidance (CSMA/CA). CSMA/CA is a contention mode access method, where all stations, with data to send, contend for the channel. The channel is awarded randomly to a contending station with no regards to the QoS requirements of any of the contending stations. The contention is managed as follows. Before transmitting, each station with data to send must first sense the medium to make sure that it is free. Once the medium is judged to be free, for a period of time equal to one Distributed Inter Frame Space (DIFS), the station randomly picks a number between 1 and its current congestion window (minimum congestion window is 31. After each collision the congestion window is doubled until it reaches a maximum). The station then starts counting down. The station that reaches zero first starts its transmission. Once a station starts transmitting, all other stations freeze their counters until a new DIFS amount of idle time is observed. After each successful transmission, the receiving station is allowed to send an acknowledgment back to the sender. A packet is perceived lost and is retransmitted if an acknowledgment does not arrive at the sender within a timeout period. Obviously this mode (DCF) does not support any quality of service assurance since there is no assurance that any station may get the channel to transmit its packets.

Since DCF is the basic mode, it can operate in a stand-alone fashion. PCF on the other hand is optional and can only exist in conjunction with the DCF mode of operation. When PCF is supported, time is divided into frames. Each frame is further divided into two sub-frames. One sub-frame supports the basic DCF mode where stations contend for the channel. The second sub-frame supports a reservation and polling based PCF medium access. Stations that need to participate in the PCF mode register with the access point. Registered stations are then polled, during the PCF period, to determine if they have data to send. However, there is no guarantee that all registered stations get polled during each PCF sub-frame. The number of polled stations in each PCF period depends on the number of stations requesting the PCF mode as well as the number of stations using the DCF mode.

In the PCF mode, the frame size is fixed a priori. The DCF mode is guaranteed a minimum share of this frame. However, the PCF mode has no explicit guaranteed minimum share of the frame. Therefore, depending on the frame size, the number of users requiring PCF mode and the number of users in the DCF mode, the PCF mode may not provide the required QoS to it users. Several studies have shown that neither DCF Several studies have shown that neither DCF nor PCF modes can provide adequate quality of service to its users.

Similar to the Ethernet case, several solutions were designed to enhance the quality of service in IEEE802.11. Wireless Rether was an offshoot of work done on the Rether protocol in a wired environment. Wireless Rether adopts a centralized token exchange scheme where each host in the LAN needs to receive a token from a Wireless Rether Server before it may transmit data. Wireless Rether attempts to guarantee bandwidth to individual applications and may require modifications to each host. In this scheme, a host may only communicate and send data traffic if the token is obtained and registration of the host is completed. Further, the total bandwidth reserved varies on the length of time the token is held. After data transmission, this token needs to be passed back to the server. Depending on the configuration, this interrupt overhead associated with the passing of the token network access latency may constitute a significant percentage of the cycle time. This problem is compounded if wireless rether is performed over multiple segments to introduce additional communication overhead to and from the Wireless Rether Server.

The problem of providing quality of service in wide area networks is a widely studied topic. However, not much work has been done to study and provide QoS in local area networks. Thus, there exists a need to develop a method and a system for meeting the quality of service needs of users in a local area network.

SUMMARY

A method, a system and an apparatus are provided for guaranteeing quality of service (QoS) in Local area networks. In one embodiment, a Local area network Resource Manager (LRM) manages local area network resources. The LRM is a plug and play software solution that provides users with several levels of QoS.

In one approach, the PSTDM approach, a broadcast frame is used to notify all transmitters about their allocated transmission slots. This approach requires broadcast communication from the Access Server to the LAN hosts once per frame and does not require any replies from the hosts. Slots are allocated to the hosts via this broadcast and data transmission proceeds independent of the Access Server for the duration of the frame. The overhead of this approach is especially lowered in highly utilized LANs. Also, this approach supports allocation based on best effort slots as well as contention based on best effort slots. In some situations the latter may lead to better slot utilization.

Once the LRM in a LAN admits a user with a certain QoS level, the level is assured within the LAN for as long as the user is in the LAN. The solution uses a combination of admission control, resource provisioning and reservation to guarantee network users the QoS level that they choose. The solution applies to any shared medium such as 802.xx (Ethernet IEEE802.3, WLAN IEEE802.11, etc.)

In one embodiment, a request is received for QoS guarantees on data transmission. The request may be generated by a variety of sources. For example, the request may be generated by manual user intervention or the request may be generated by applications that directly request their own resources by using protocols such as the Dynamic Service Negotiation Protocol (DSNP). To facilitate processing of the request, the LRM divides time within the LAN, into frames. Frames are further sub-divided into slots. Various classes of time slots are used to accomplish control and data transmission functions. For example, time slots may include Access Server time slots that are used by the access server to communicate with users in a LAN. Common Control slots (CCS) may be used to deliver control messages to the LAN or the Access Server. Best Effort Slots (BES) may be used for receiving and transmitting best effort traffic. In addition, time slots may include Dedicated Traffic Slots (DTS) that may be reserved by a particular user for data transmission.

In one embodiment, Dedicated Traffic Slots (DTS) are allocated. DTS may start in an initial state. A DTS in the initial state is unreserved and free to be used by any user. When a DTS is allocated to a user, for example after the user requests a DTS, the time slot may move to a first state. When in the first state, the time slot may be reserved and may only be used by the designated user. As the user transmits data, the time slot remains in the first state (i.e., reserved for the user and in use by the user). If the user suspends transmission of data, the time slot may convert to a second state. The second state is characterized by being idle but still reserved for the user. In this state, no other user may transmit during the time slot. If the DTS stays in the second state for a first predetermined period of time, the DTS may transition into a third state. A DTS in this state may be used for best effort traffic transmission on a per frame basis. A DTS in the third state may not be reserved for any users. If the reserving user resumes data transmission, the slot may transition back to the first state. However, if the DTS stays in the third state for a second predetermined period time, the DTS may move into the initial state. Both, the first and the second predetermined periods of time may vary based on the characteristics of the network. For example, the predetermined periods of time may vary based on time of day with data transmission at night having longer predetermined periods of time than data transmission during the day because of differences in traffic load.

DETAILED DESCRIPTION OF THE DRAWINGS

Aspects of the present invention provide a system and a method for providing quality of service (QoS) in local area networks (LANs). Users in a LAN may transmit data on a channel with an assured level of QoS once a network LAN Resource Manager (LRM) admits a user with the certain QoS level. For example, aspects of the present invention provide admission control, resource provisioning or reservation to guarantee network users with appropriate and adequate QoS levels. The present invention is further applicable to any shared medium such as, but not limited to, Ethernet IEEE802.3, WLAN IEEE802.11, etc.

Figure 1:
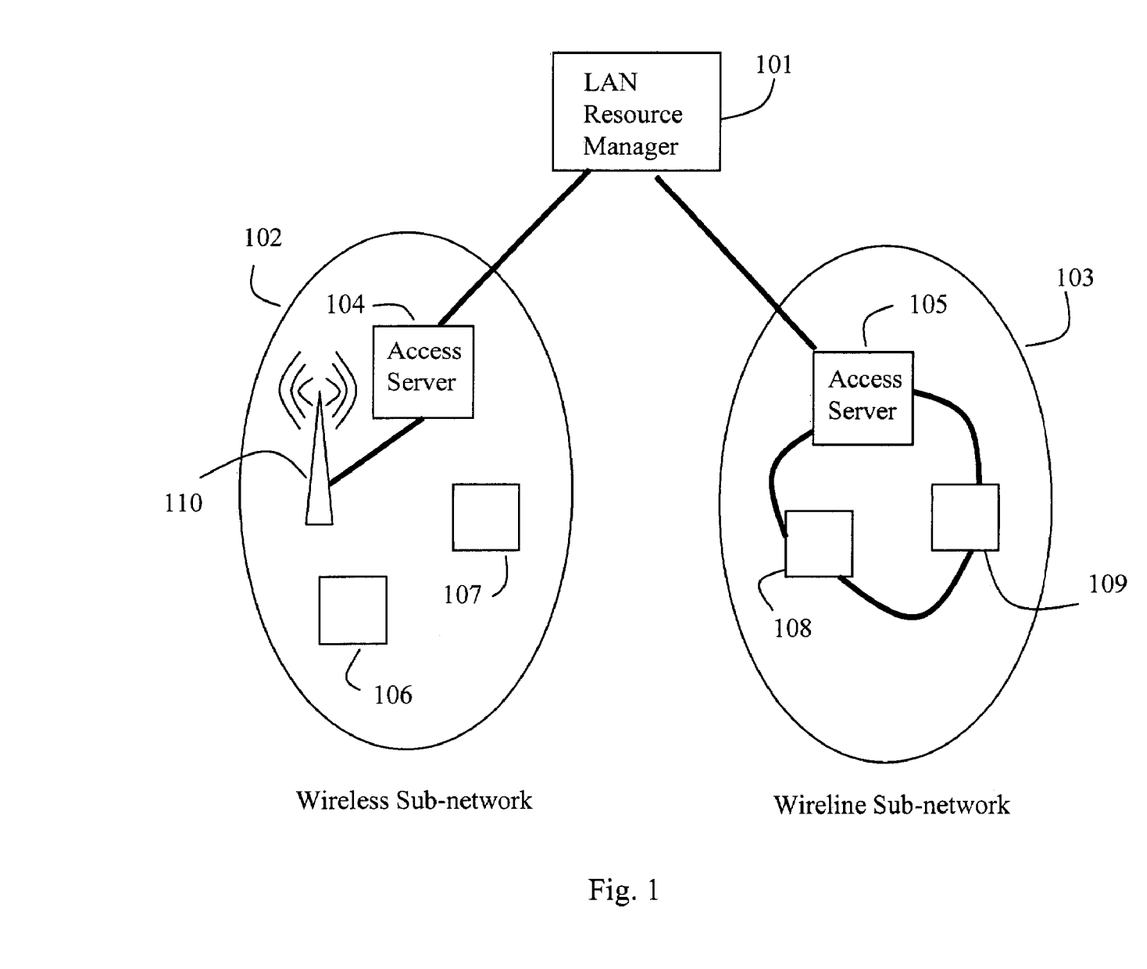
FIG. 1 shows an illustrative high-level architecture in accordance with aspects of the present invention.

FIG. 1 shows an illustrative high-level architecture. In this example, a LAN Resource Manager (LRM) 101 is provided that connects to a sub-network (e.g., 102, 103). For illustration purposes, FIG. 1 shows two sub-networks (102, 103) of which one is a wireless sub-network 102 and one is a wireline sub-network 103. However, it should be understood that the present invention is not so limited as any number and any type of sub-networks may be used.

The LRM 101 may coordinate the LAN in terms of media access and quality of service. The LRM 101 may determine which node may transmit data, how much data the node may transmit and when the node may transmit data, for example. Thus the LRM 101 may decide the characteristics of data transmission among the nodes (106, 107, 108, or 109).

Each sub-network may contain nodes or users (e.g., 106, 107, 108, and 109). In a wireless network 102, for example, nodes or users (106, 107) may communicate through an access point 110 which may interconnect a wireless network to a wired LAN. Each sub-network (102, 103) may contain an Access Server (AS) (104, 105). An access server (AS) (104, 105) in a sub-network may act as a master in its domain, such as in the corresponding sub-network, and may tell nodes within the sub-network when to transmit. The AS (104, 105) in a sub-network (102, 103) may enforce the decision of the LRM 101 in terms of data transmission characteristics. For example, the AS (104, 105) may instruct the nodes (106, 107, 108, 109) in the sub-network (102, 103) when each node (106, 107, 108, 109) may transmit data or for how long each node may transmit data. Thus, the characteristics of data transmission may be enforced among the nodes and within the sub-networks in the LAN.

Figure 4A:
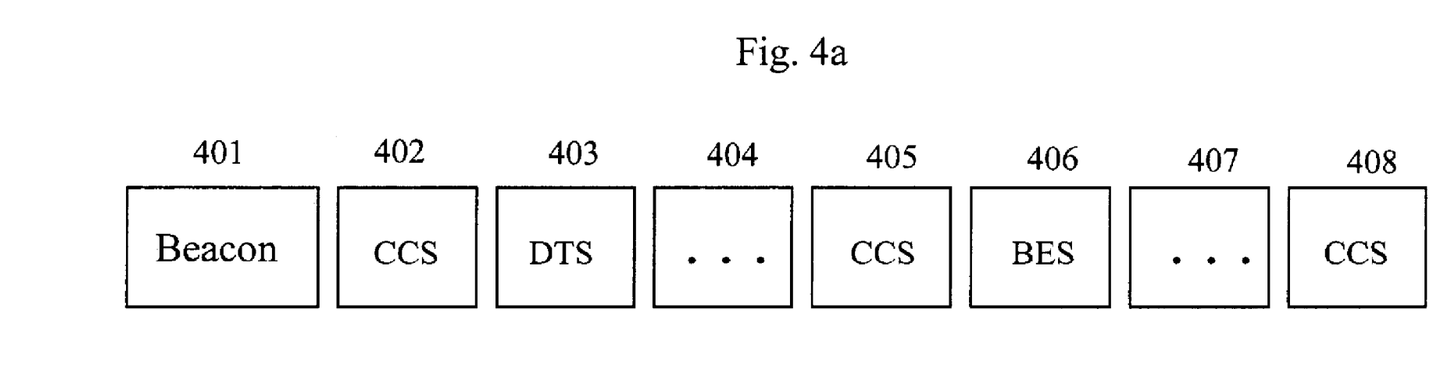
FIG. 4 shows an illustrative frame layout with slot categories in accordance with aspects of the present invention.
Figure 4B:
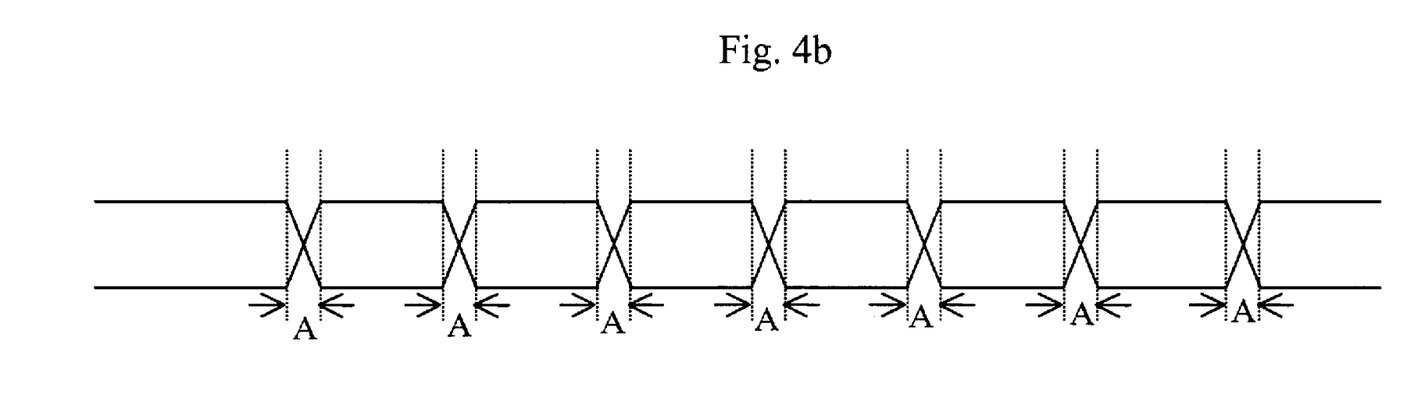

The LRM 101 may divide time into frames to manage each LAN. Each LAN may contain wired and wireless components. The LRM 101 may manage media access in the LAN through the Access Servers (AS) (104, 105) of the corresponding sub-networks through a variety of formats. In one embodiment of the present invention, the LRM 101 may manage media access through Packet-Switched Time Division Multiplexing (PSTDM). Time may be divided into frames. Each sub-network may have frames of a particular length that may be unique to the particular sub-network depending on the requirements and characteristics of the sub-network. The size of the frames may vary based on many factors, such as but not limited to the media itself. For example, Ethernet systems may need a smaller frame size. FIGS. 4A and 4B describe illustrative embodiments of PSTDM.

The frames are further divided into slots, which may also vary in size based on the particular sub-network. For example, the frame size and/or slot size may vary based on the speed of the medium in the sub-network or the type of services that the sub-network provides.

Figure 2:
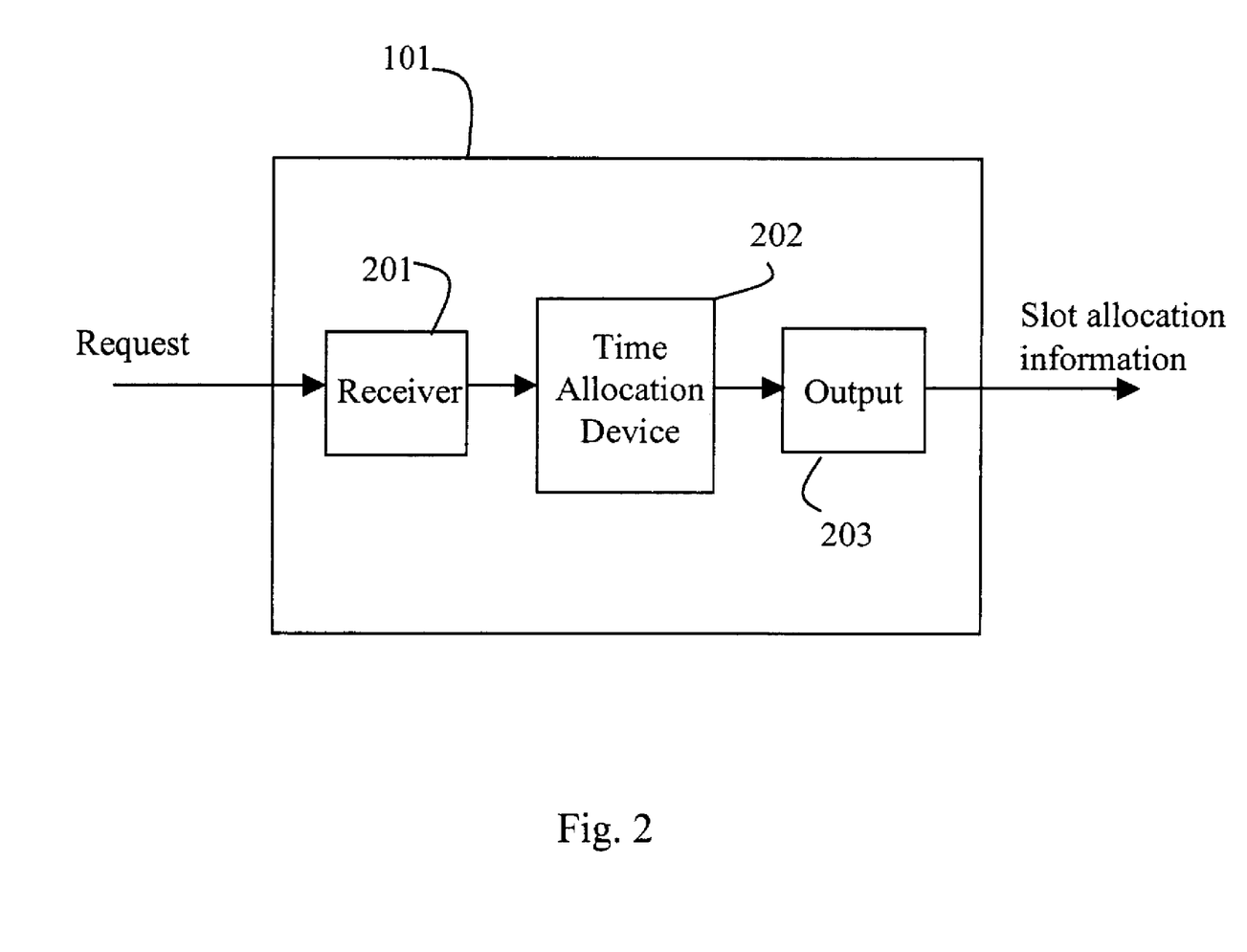
FIG. 2 shows an illustrative LRM in accordance with aspects of the present invention.

FIG. 2 shows an illustrative LRM. In this example, the LRM 101 may contain a receiver for receiving a request for data transmission. For example, a user may request to transmit data by sending a request to the LRM 101. There are a variety of methods a user may use to send a request to the LRM 101. For example, a user may access the LRM 101 through a web interface (not shown) such that a request to transmit data may be submitted to the LRM 101 through the web. Alternatively, applications may directly request resources through the LRM 101. The request for data transmission may be received through the receiver 201. The LRM 101 determines slot allocation through a time allocation device 202. The LRM 101 may divide time into frames and further divide frames into time slots. The slots may be allocated to the users wishing to transmit data. If slot allocation is possible and the request is granted, the LRM 101 may send a message through the output 203 such that users in a LAN may transmit data based on the slot allocation scheme provided.

Figure 3:
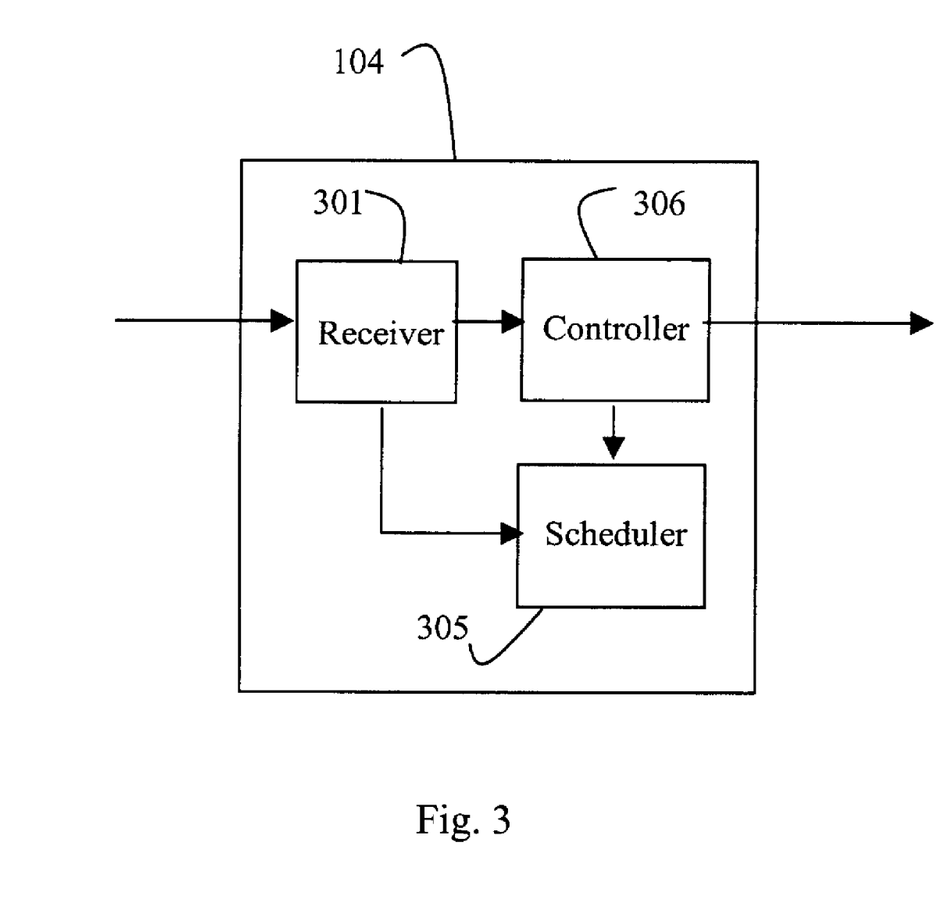
FIG. 3 shows an illustrative access server in accordance with aspects of the present invention.

FIG. 3 shows an illustrative access server. In this example, the access server 104 may contain a receiver 301 for receiving slot allocation information, a controller 306 for providing slot allocation information to a user and a scheduler 305 that may prepare a queue for reserved traffic or schedule the queue according to the slot allocation. The LRM 101 may send slot allocation information to the Access Server 104 that receives the slot allocation through the receiver 301.

FIG. 4a shows an illustrative frame layout with slot categories. Each frame contains a number of slots, the slots being categorized into various categories. For example, the slots may include access server control slots, common control slots, best effort slots and dedicated traffic slots. Further, other slots may be substituted for or used in addition to these slots.

Generally, at least one slot may be needed in a conversation. Time slots may be spaced such that they do not overlap. FIG. 4b illustrates safeguards placed on the slots so that they do not overlap. This spacing accounts for line noise and feedback. The access server or other device may make the addition of the spacing. In this embodiment, a small delay, labeled "A" in FIG. 4b, may be added in the transition between the time slots such that the time slots do not overlap and data integrity may be maintained.

Access server control slots are used by the access server to communicate with nodes within the sub-network. One example of an access server control slot is a beacon 401. A beacon 401 is typically the first slot in a frame. The beacon 401 sends information that is used so that each participant may synchronize activity. By synchronizing, skew is minimized. The beacon 401 may optionally provide information on the Access server ID, the location of common control slots, frame length, slot size or the location of the best effort slots, for example. Although the beacon 401 typically occurs first in the frame and typically only one beacon 401 is present per frame, the other slots that may be used may occur in any order. Further, there may be any number of each of the other slots within a frame.

Common control slots (402, 405, 408) may also be present in a frame and may vary in number in a frame depending on the characteristics and requirements of the sub-network. The common control slots (402, 405, 408) may be used to deliver control messages to the AS (104, 105) from the users. They may also be used to deliver control messages to the LRM 101 from the users. Common control slots (402, 405, 408) typically permit more than one user to send data. Therefore, common control slots (402, 405, 408) might not be collision free depending on the media access control (MAC) used in the sub-network.

Best effort slots 406 are used to transmit best effort traffic. Typically, but not always, there are a minimum number of best effort slots 406 present in each frame. Because there may be a minimum number of best effort slots 406 present in each frame, there is typically often a chance to transmit data via these slots. Multiple users may attempt to transmit data simultaneously in best effort slots 406, thereby potentially causing packet collision and data loss. However, best effort slots 406 may alternatively be assigned by the AS among the best effort users such that collision may be minimized or avoided.

Also, Dedicated Traffic Slots (DTS) 403 may be reserved through the LRM 101, for example. Dedicated Traffic Slots (DTS) are slots that may be used to transmit data of a user that has currently reserved the slot. If a user reserves a Dedicated Traffic Slot 403 to transmit data, then typically only that user may transmit during the reserved time slot. However, the reserved time slot may undergo state changes such that access to the time slot may vary depending on the status of the user and/or status of the time slot. Many other factors may influence the length of time to wait before changing states, however. For example, the length of time to wait or the number of time slots to wait may vary based on the time of day of data transmission. In this example, data transmission during certain times of the day may be expected to have longer idle times whereas data transmission during other times of the day may be expected to have shorter idle times. The predetermined period of time to wait may be adjusted accordingly for the state machine.

Figure 5:
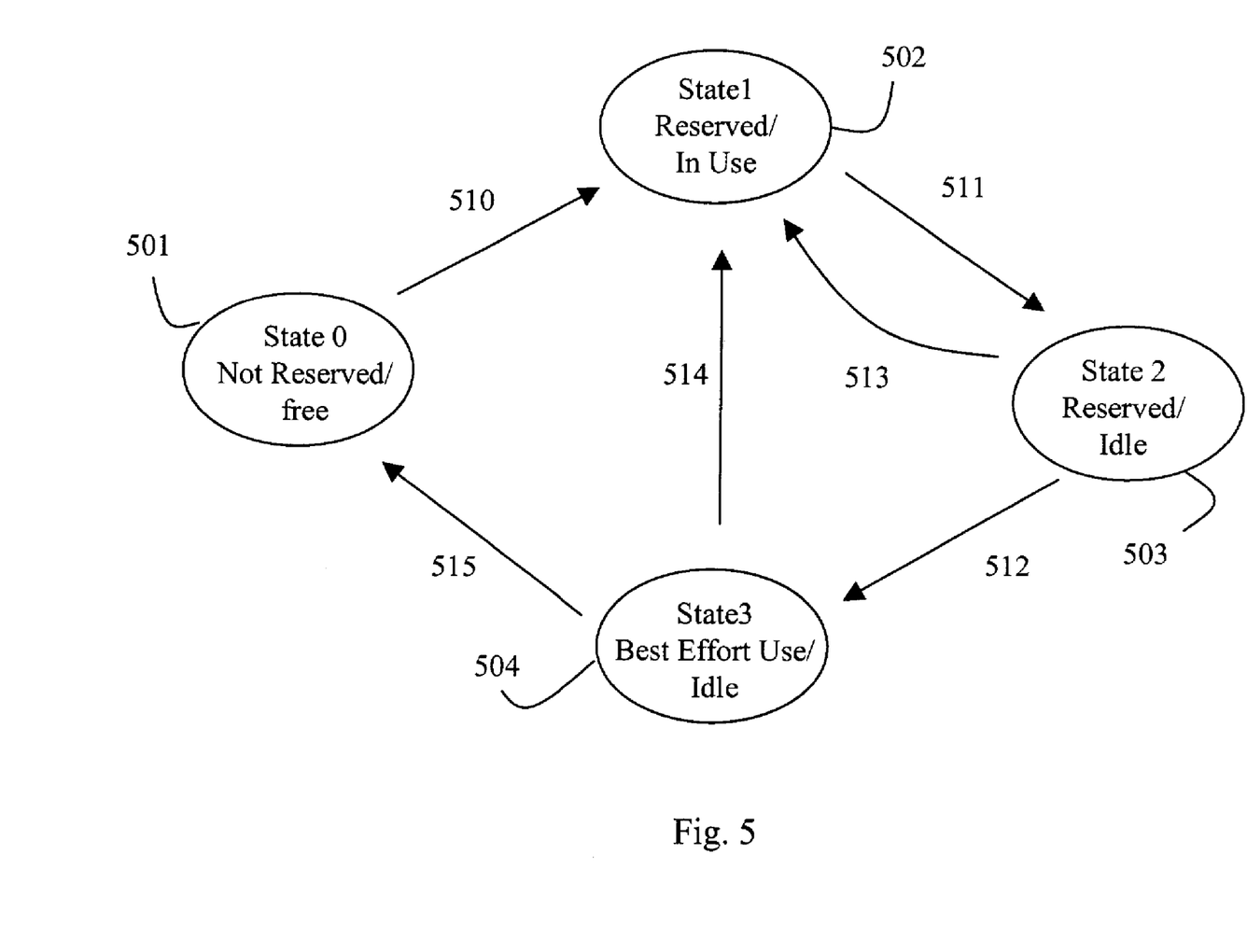
FIG. 5 illustrates the state transitions of a Dedicated Traffic Slot (DTS) in accordance with embodiments of the present invention.

FIG. 5 illustrates the state transitions of a Dedicated Traffic Slot (DTS) 403. In this illustration, a time slot starts in State0 (501) indicating that the time slot is not reserved and is free to be used by any user in the LAN for data transmission. In step 510, a user requests to reserve a time slot causing the time slot to move into State1 (502). In State 1 (502), the time slot is reserved and is in use by a user. If the user ceases transmitting data during the time slot for a first predetermined period of time, which may vary based on characteristics of the network, the time slot enters State2 (503) illustrated as step 511 in FIG. 5. In State2 (503), the time slot is idle but remains reserved for the user to transmit data. If the user begins transmitting data again within a second predetermined period of time, which may vary based on characteristics of the network, the time slot returns to State1 (502) as illustrated in step 513. However, if the user does not resume transmission of data, the time slot remains reserved in State2 for the user such that other users may not use the time slot to transmit data. If the user remains idle while the time slot is in State2 (503) for a second predetermined period of time, for example, 2 or 3 frames, the slot undergoes a first timeout such as a level 1 timeout (step 512) and the slot enters State3 (504) in which the time slot may be placed into a pool of best effort slots. The second predetermined period of time may vary based on the characteristics of the network. If this occurs, the AS (104, 105) may optionally advertise the time slot as a best effort slot 406 such that any user may use the slot to transmit data on a best effort basis as long as the user who initially reserved it continues to remain idle. However, if the user who initially reserved it begins transmitting data again at this time, the time slot returns to State1 as being reserved and in use by the user (step 514). However, if the user remains idle for a third predetermined period of time (for example, 30-40 frames) while the time slot is in State3 (504), the time slot will undergo level 2 timeout and return to State0 (501) via step 515, which is not reserved and is free to be used by other users. Each of the first, second and third predetermined periods of time may vary based on network characteristics and traffic demands.

In the above illustrative state machine, the state of the time slot may change based on the predetermined period of time that the user remains idle. This predetermined period of time may vary based on the characteristics of the data or the requirements and qualities of the system. For example, the predetermined period of time may be determined by the number of time slots to wait before changing states. If voice data is being transmitted, there may be a higher number of time slots to wait, for example, because silent periods in a voice stream are common. However, if the data transmission involves video data, for example, the predetermined period of time may be relatively short because silent periods during video data are not as common. Further, the threshold may be adjusted based on the time of day. For example, use during the day may be higher than use at night. Therefore, the predetermined period of time to wait before changing states may vary based on the needs, requirements and characteristics of various factors including the data being transmitted.

Figure 6:
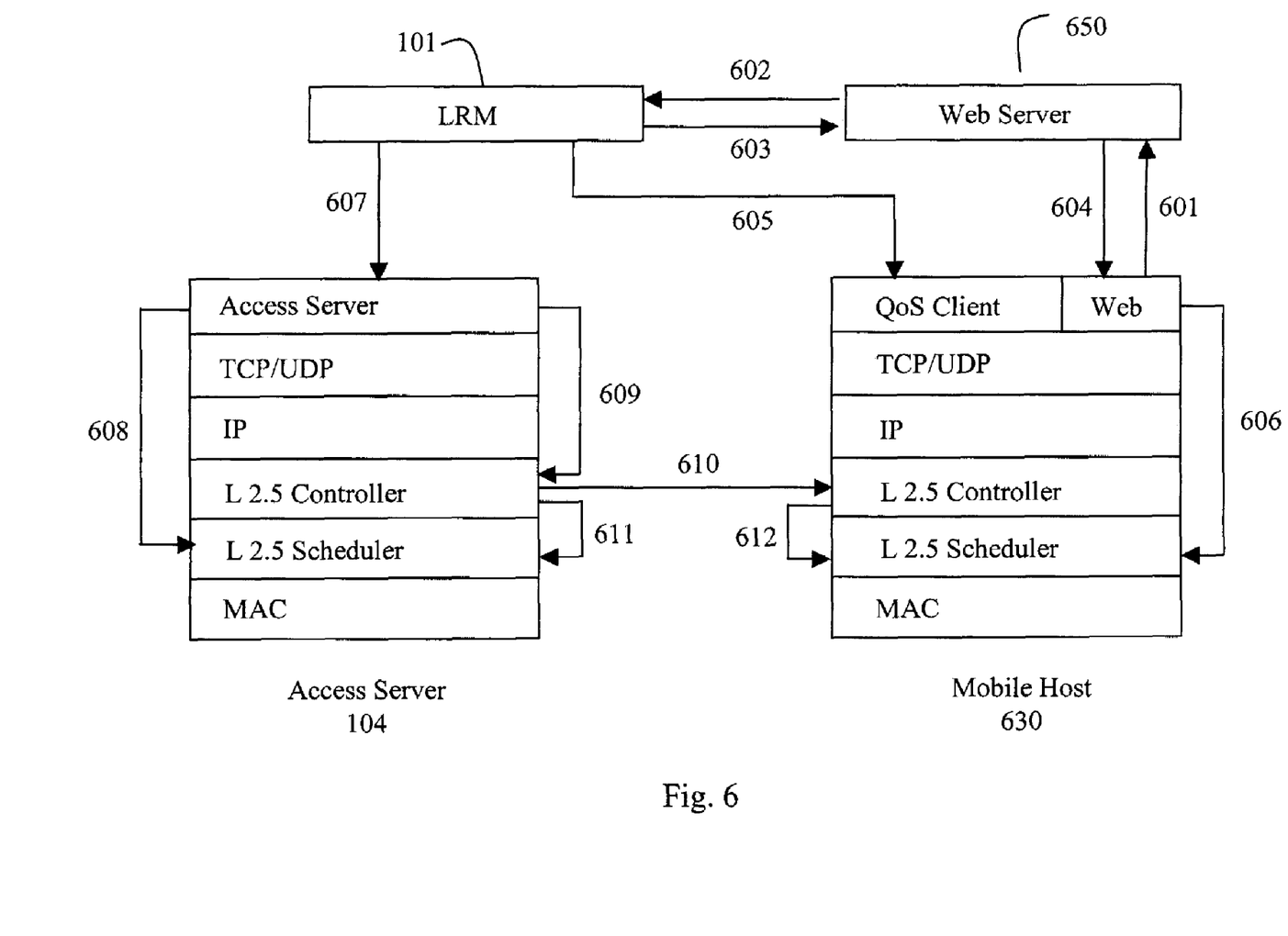
FIG. 6 shows an illustrative example of reserving resources through a LAN resource manager in accordance with embodiments of the present invention.

FIG. 6 illustrates an example of reserving resources through the LRM 101. In this example, a user or mobile host 630 may place a request to transmit data (step 601). The request may be made over the Internet through a web server 650 as the example illustrates. However, the invention is not so limited as any number of methods may be used to request resources. For example, as an alternative method, LRM-aware applications may request their own resources directly from the LRM 101 using a Dynamic Service Negotiation Protocol (DSNP), which is a protocol to negotiate the Service Level Specification in IP layer and can be used for service negotiation from host to network, network to host, and network to network. A detailed description of DSNP is beyond the scope of the discussion of the present invention and will not be presented here.

In the example illustrated in FIG. 6, such requests may be made from anywhere, such as from a doctor's office waiting room or an airport, for example. The request is referred to the LRM 101 from a web server 650, for example, as illustrated by step 602. The LRM 101 may decide if the request may be accepted. If the LRM 101 determines that the request may be accepted, the LRM 101 sets up the required resource allocation. Optionally, the LRM 101 may send a message back to the web server (step 603) which may return the message from the LRM 101 to the mobile host 630 (step 604). Alternatively, the LRM 101 may optionally send a message directly back to the QoS client of the mobile host 630 (step 605). For example, if no allocation is possible, then the LRM 101 may send a message rejecting the request back to the mobile host 630 directly (step 605) or through the Web Server (steps 603, 604) back to the mobile host 630.

After the LRM 101 determines that the dedicated slots are sufficient and that the request may be accepted, the LRM 101 provides information for slot assignment to the Access Server 104 (step 607). The Access Server 104 controls the LAN where the user or mobile host 630 resides. This may be accomplished by the Access Server 104 by controlling an L 2.5 scheduler (step 608) and an L 2.5 controller at the Access Server (step 609) such that the L 2.5 controller at the Access Server may send a message to the L 2.5 controller of the user or Mobile Host 630 (step 610) to inform the user or mobile host 630 of the slot allocation. The L 2.5 controller of the Access Server 104 further informs the L 2.5 Scheduler of the Access Server 104 of the slot allocation (step 611) and the L 2.5 controller of the user or mobile host 630 also informs the L 2.5 Scheduler of the user or mobile host 630 what slots are assigned and when they can transmit (step 612). The Mobile Host 630 may also control the L 2.5 Scheduler (step 606) in data transmission and assignment of slots. Thus, the Access Server 104 may receive slot assignment information from the LRM 101 (step 607) and may speak, using a lower communication, layer with the mobile host to allocate the request.

Another example to illustrate the process includes communication through a Voice over IP (VoIP) conversation. A user may request access to the system to transmit data in a VoIP call by placing a request with the LRM 101. The LRM determines if the call may be accepted based on various factors including where the call is from and where it is going. After the LRM 101 determines that the call may be accepted, the LRM 101 may employ a slot allocation scheme to select free slots in a frame to provide the necessary QoS. The LRM 101 may also send slot allocation information to the AS (104, 105) of the sub-network. The AS (104, 105) may then enforce the assignment of the call to designated time slots and dedicated traffic slots may proceed to the state machine. Also, best effort traffic may be accommodated. If requested, the LRM 101 may allocate a dedicated time slot to State1 such that the dedicated time slot is reserved for and in use by the user, however, the dedicated time slot may change to best effort use if the user does not transmit data in the time slot and remains idle for a predetermined length of time. If this occurs, other users may transmit data in the dedicated time slot until the first user resumes data transmission in which case the dedicated time slot will return to a reserved and in use state. However, if the first user remains idle beyond a certain predetermined period of time, the dedicated time slot will return to an initial state of not reserved and free. When this happens, the time slot is free to be used by any user and may be reserved by a different user.

In another example of the present invention, a registration message may be received at the LRM 101. The LRM 101 responds by allocating time slots in time frames for data transmission among 5 users, for example. If slot allocation is possible, the LRM 101 sends the slot allocation information to the Access Server (104, 105). The slot allocation information may be, for example, that the time slots are best effort traffic and that the Access Server (104, 105) may schedule the slots such that each of 5 users has 4 best effort slots each. In this example, if the number of slots per user decreases, then a larger number of users may be permitted to transmit data.

In another example, the LRM 101 may send slot allocation information to the Access Server (104, 105) such that the slot allocation information may be, for example, that slots 20-45 are best effort slots. In this example, it is first come-first served. Users must compete for the best effort slots.

Thus, a method, system and apparatus are provided for managing data transmission and communication in a LAN such that QoS requirements are addressed. The method and system does not require polling of users but rather involves time division multiplexing. Using this novel method involving time division, communication overhead is minimized thus increasing efficiency and lowering costs. Also, aspects of the present method and system permit management of data transmission in a LAN without necessitating modification of the MAC (Medium Access Control) layer of any of the LANs or modification of any hardware or firmware. Thus, effective and improved QoS may be achieved without overhead and increased costs. All modifications may be confined to the IP (Internet Protocol) layer.

It is understood that the present invention can take many forms and embodiments. The embodiments shown herein are intended to illustrate rather than to limit the invention, it being appreciated that variations may be made without departing from the spirit or the scope of the invention.

Although illustrative embodiments of the invention have been shown and described, a wide range of modification, change and substitution is intended in the disclosure and in some instances some features of the present invention may be employed without a corresponding use of the other features. Accordingly, it is appropriate that the appended claims be construed broadly and in a manner consistent with the scope of the invention.

What is claimed is:

1. A method for managing data transmission in a local area network comprising:
   receiving a request for data transmission;
   determining time frames, said time frames including time slots, said time slots including at least one dedicated traffic slot in an initial state characterized by being unreserved and not in use and being configured to convert to a first state characterized by being reserved and in use by a user if the dedicated traffic slot is in the initial state;
   allocating the time slots to determine time slot allocation information; and
   providing the time slot allocation information for data transmission,
   wherein the dedicated traffic slot converts to a second state characterized by being idle and reserved for the user if the dedicated traffic slot is in the first state and if data is not transmitted by the user in a first predetermined period of time,
   the dedicated traffic slot converts to a third state characterized by being idle and for best effort use if the dedicated traffic slot is in the second state and if data is not transmitted by the user in a second predetermined period of time, and
   the dedicated traffic slot converts to the initial state if the dedicated traffic slot is in the third state and if data is not transmitted by the user in a third predetermined period of time.

2. The method of claim 1, wherein dedicated traffic slot converts to the first state if the dedicated traffic slot is in the second state and data is transmitted by the user within the second predetermined period of time.

3. The method of claim 1, wherein the dedicated traffic slot converts to the first state if the dedicated traffic slot is in the third state and data is transmitted by the user in the third predetermined period of time.

4. The method of claim 1, wherein the time slots further comprise at least one common control slot for delivering control messages.

5. The method of claim 1, wherein the time slots further comprise at least one best effort slot for receiving or transmitting best effort traffic.

6. The method of claim 1, wherein the time slots comprise at least one control slot for communication with an access server.

7. The method of claim 6, wherein a control slot is a beacon.

8. The method of claim 7, wherein the beacon comprises information on at least one of an identification of an access server, the location of common control slots, time frame length, time slot size and location of best effort slots.

9. The method of claim 7 wherein the beacon is in a first time slot position in a time frame.

10. The method of claim 1, wherein said receiving comprises receiving the request for data transmission through a web interface.

11. The method of claim 1 wherein said receiving comprises receiving the request from applications for resources using a Dynamic Service Negotiation Protocol (DSNP).

12. The method of claim 1 wherein said allocating comprises allocating time slots based on quality of service (QoS).

13. The method of claim 1 wherein said allocating comprises selecting free time slots in a frame, the selected free time slots providing a desired level of quality of service (QoS).

14. A method for managing data transmission in a local area network (LAN) comprising:
   receiving at a LAN resource manager a request for data transmission, said LAN resource manager including a time allocation device for allocating time slots for data transmission among users in the LAN;
   allocating the time slots to obtain time slot allocation information; and
   providing the time slot allocation information to an access server, said access server including a controller for providing the time slot allocation information to a user in the LAN,
   wherein the time slots for data transmission include at least one each of an access server control slot, a common control slot, a data slot that is converted between a best effort slot and a dedicated traffic slot based on a reservation from the user,
   wherein the time slots for data transmission comprise at least one dedicated traffic slot in an initial state characterized by being unreserved and not in use, and
   wherein the dedicated traffic slot is configured to convert to a first state characterized by being and in use by a user if the dedicated traffic slot is in the initial state, wherein the dedicated traffic slot converts to a second state characterized by being idle and reserved for the user if the dedicated traffic slot is in the first state and if data is not transmitted by the user in a first predetermined period of time, the dedicated traffic slot converts to a third state characterized by being idle and for best effort use if the dedicated traffic slot is in the second state and if data is not transmitted by the user in a second predetermined period of fine, and the dedicated traffic slot converts to the initial state if the dedicated traffic slot is in the third state and if data is not transmitted by the user in a third predetermined period of time.

15. The method of claim 14, wherein the time slot allocation information comprises information on free time slots in a frame that provide a desired level of quality of service (QoS).

* * * * *

UNITED STATES PATENT AND TRADEMARK OFFICE
CERTIFICATE OF CORRECTION

| | | |
|---|---|---|
| PATENT NO. | : 7,349,378 B2 | Page 1 of 1 |
| APPLICATION NO. | : 10/370719 | |
| DATED | : March 25, 2008 | |
| INVENTOR(S) | : Elaoud et al. | |

It is certified that error appears in the above-identified patent and that said Letters Patent is hereby corrected as shown below:

In the Claims

In Column 12, Line 2, in Claim 14, delete "being" and insert -- being reserved --, therefor.

In Column 12, Line 4, in Claim 14, delete "wherein" and insert -- and wherein --, therefor.

In Column 12, Line 13, in Claim 14, delete "fine," and insert -- time, --, therefor.

Signed and Sealed this
Eighteenth Day of November, 2014

Michelle K. Lee
*Deputy Director of the United States Patent and Trademark Office*